(12) United States Patent
Bedau et al.

(10) Patent No.: US 12,163,862 B2
(45) Date of Patent: Dec. 10, 2024

(54) ARRANGEMENT AND METHOD FOR CARRYING OUT A SELF-LOAD TEST ON A RAIL VEHICLE

(71) Applicant: Siemens Mobility GmbH, Munich (DE)

(72) Inventors: Christian Bedau, Berlin (DE); Jürgen Schurr, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 227 days.

(21) Appl. No.: 17/920,873

(22) PCT Filed: Mar. 4, 2021

(86) PCT No.: PCT/EP2021/055524
§ 371 (c)(1),
(2) Date: Oct. 24, 2022

(87) PCT Pub. No.: WO2021/213724
PCT Pub. Date: Oct. 28, 2021

(65) Prior Publication Data
US 2023/0184632 A1 Jun. 15, 2023

(30) Foreign Application Priority Data
Apr. 23, 2020 (DE) .................... 10 2020 205 179.8

(51) Int. Cl.
*G01M 17/08* (2006.01)
*B61L 15/00* (2006.01)

(52) U.S. Cl.
CPC ......... *G01M 17/08* (2013.01); *B61L 15/0081* (2013.01)

(58) Field of Classification Search
None
See application file for complete search history.

(56) References Cited

U.S. PATENT DOCUMENTS 8,487,559 B2   7/2013   Holweck et al.
9,415,781 B2 *  8/2016   Hardin ................... B61C 17/04
(Continued)

FOREIGN PATENT DOCUMENTS

CN      110406549 A     11/2019
DE    102008023332 A1   12/2009
(Continued)

OTHER PUBLICATIONS

Anonymous:; "Dynamic braking"; Wikipedia; https://en.wikipedia.org/w/index.php?title=Dynamic_braking&oldid=935748054; 2020.

*Primary Examiner* — Daniel L Greene
(74) *Attorney, Agent, or Firm* — Laurence A. Greenberg; Werner H. Stemer; Ralph E. Locher

(57) ABSTRACT

An arrangement and a method for carrying out a self-load test on a rail vehicle which has a dual-mode drive system. A first drivetrain of the rail vehicle includes a diesel engine, which is coupled to an electric generator to generate electrical power. The generator is connected via a first converter to a DC link to transfer the power delivered by the generator as required into the DC link. A second drivetrain of the rail vehicle has an electrical line system, which is connected via a second converter to the DC link to transfer power from the line system as required into the DC link. During the self-load test of the diesel engine, the power delivered by the generator passes in part via a third converter to a braking resistor and in part via the second converter into the line system.

9 Claims, 4 Drawing Sheets

(56) References Cited

U.S. PATENT DOCUMENTS

| | | | |
|---|---|---|---|
| 2006/0255656 A1* | 11/2006 | Linebach | B60L 9/005 |
| | | | 303/113.2 |
| 2008/0290825 A1 | 11/2008 | St-Jacques et al. | |
| 2009/0045761 A1* | 2/2009 | Fuchs | B60L 9/00 |
| | | | 318/375 |
| 2010/0013299 A1* | 1/2010 | Amler | H02P 3/22 |
| | | | 307/82 |
| 2010/0186619 A1* | 7/2010 | Kumar | B60L 9/005 |
| | | | 104/288 |
| 2014/0012446 A1* | 1/2014 | Kumar | B60W 10/08 |
| | | | 903/930 |
| 2015/0008674 A1 | 1/2015 | Hatanaka | |
| 2015/0377159 A1* | 12/2015 | Fisher | F02D 41/0027 |
| | | | 123/525 |
| 2019/0326778 A1* | 10/2019 | Kondo | G01R 31/343 |

FOREIGN PATENT DOCUMENTS

| | | | |
|---|---|---|---|
| EP | 1186497 A1 | 3/2002 | |
| EP | 0730539 B1 | 5/2002 | |

\* cited by examiner

ARRANGEMENT AND METHOD FOR CARRYING OUT A SELF-LOAD TEST ON A RAIL VEHICLE

CROSS-REFERENCE TO RELATED APPLICATIONS

This application is a 371 National Stage of International Application No. PCT/EP2021/055524 designating the United States, filed on 24 Oct. 2022, which claims priority to German Patent Application No. 102020205179.8, filed on 23 Apr. 2020 (20200423), the disclosures of which are incorporated by reference herein in their entireties.

FIELD AND BACKGROUND OF THE INVENTION

The invention relates to an arrangement and a method for carrying out a self-load test on a rail vehicle (in particular a locomotive) that has what is known as a dual-mode drive system.

In the dual-mode drive system considered here, two drive systems in parallel with one another are provided in the rail vehicle. In this case, a first drive system is based on a diesel engine that is operated as an internal combustion engine. The diesel engine is used to drive a generator. The generator in turn forms a corresponding electrical power that is fed to electric drive motors of the rail vehicle for the purpose of locomotion.

In the dual-mode drive system considered here, a second drive system is based on the operation of the rail vehicle on the contact wire. A current collector is used to draw energy or power from the contact wire, to convert it and to feed it to the electric drive motors of the rail vehicle for the purpose of locomotion.

The diesel engine has a load applied to it, which in the maximum case corresponds to the nominal load of the diesel engine, for the purpose of suitability testing, for example within the context of a maintenance plan. This is referred to as "diesel engine self-load test" or as "self-load test".

This test can be carried out by the customer by way of a separate diesel engine test in which the diesel engine is connected to what is known as a load machine on a specific test stand and operated under a corresponding load.

As an alternative thereto, during the self-test, the power of the diesel engine is fed to the braking resistor through appropriate use of a drive chain of the locomotive by the main generator having a downstream converter and braking unit when stationary. The power or energy that is generated during the self-test is converted into heat in an installed braking resistor.

An external additional load resistor is connected in parallel with a braking resistor that is present inside the vehicle if the power that is to be converted were to exceed the nominal power of the braking resistor inside the vehicle.

FIG. 3 shows, as an example of a rail vehicle, components of a diesel-electric locomotive LOK3 and the use thereof during the self-load test in accordance with the prior art.

A diesel engine DM is operated as internal combustion engine and is mechanically connected to a generator GEN via a coupling. The generator GEN is driven mechanically by the diesel engine DM, wherein the generator GEN is coupled to an excitation device ERG in order to form electrical power.

Electrical power that is formed by the generator GEN passes to an AC/DC converter WSGSW1, which forms a DC voltage from the AC voltage that is supplied. In order to reduce a voltage ripple in the subsequent link circuit, a capacitor C is connected in parallel or provided on the output side of the AC/DC converter WSGSW1.

The output side of the AC/DC converter WSGSW1 is connected to inputs of three parallel-connected DC/AC converters GSWSW1 to GSWSW3 such that the DC voltage that is formed by the AC/DC converter WSGSW1 is applied to all of the inputs of the three DC/AC converters GSWSW1 to GSWSW3.

From the DC voltage that is supplied, the three DC/AC converters GSWSW1 to GSWSW3 form respective AC voltages for further use.

A first DC/AC converter GSWSW1 forms an AC voltage for a first drive motor MOT1 and for a second drive motor MOT2 of the rail vehicle or locomotive.

A second DC/AC converter GSWSW2 forms an AC voltage for a third drive motor MOT3 and for a fourth drive motor MOT4 of the rail vehicle or locomotive.

A third DC/AC converter GSWSW3 forms an AC voltage for auxiliary drives (for example compressors, ventilation, etc.) or for further uses, denoted by AUX, in the rail vehicle or the locomotive.

The output side of the AC/DC converter WSGSW1 is furthermore also connected to inputs of a DC/DC converter GSGSW, which is likewise connected in parallel with the three DC/AC converters GSWSW1 to GSWSW3, such that the DC voltage that is formed by the AC/DC converter WSGSW1 is applied to the inputs of the DC/DC converter GSGSW.

The electrical power that is formed during the self-test of the diesel engine DM is fed via the DC/DC converter GSGSW to a braking resistor RBR, which is arranged in the rail vehicle or in the locomotive LOK3. This is marked by the reference sign "Inside LOK3".

In addition, within the self-test, a vehicle-external load resistor RLOAD is connected in parallel with the braking resistor RBR. This is marked by the reference sign "Outside LOK3".

The two resistors RBR, RLOAD convert the electrical power that is fed to them into heat.

FIG. 4 shows, as an example of a rail vehicle, components of a dual-mode locomotive LOK4 and the use thereof in the self-load test in accordance with the prior art.

The statements made above apply to the same reference signs in relation to FIG. 3.

In addition to the drive system having the diesel engine DM, a further drive system is provided here. This is based on an electrical operation of the rail vehicle using an overhead line and a current collector or pantograph PANT.

The current collector PANT draws electrical power or energy from the overhead line, which is designed here, for example, as a high-voltage line HSPL, and feeds said power or energy to a transformer TR via a main switch HS.

The transformer TR forms from an AC input voltage fed thereto a predetermined AC output voltage, which passes to inputs of a further AC/DC converter WSGSW2.

The AC/DC converter WSGSW2 forms from the AC voltage fed thereto a DC voltage, which passes to the inputs of the three DC/AC converters GSWSW1 to GSWSW3 and to the inputs of the DC/DC converter GSGSW.

The electrical power that is formed during the self-test of the diesel engine DM is in turn fed via the DC/DC converter GSGSW to the braking resistor RBR, which is arranged in the rail vehicle or in the locomotive LOK4. This is marked by the reference sign "Inside LOK4".

In addition, within the self-test, the vehicle-external load resistor RLOAD is connected in parallel with the braking resistor RBR. This is marked by the reference sign "Outside LOK4".

The two resistors RBR, RLOAD convert the electrical power that is fed to them into heat.

Conversion into heat via the vehicle-external load resistor or via the internal braking resistor is complex, costly, inconvenient and also not optimal from an environmental point of view.

It is the object of the present invention to specify an improved arrangement for carrying out a self-load test in a dual-mode rail vehicle.

The object is achieved by the features as claimed.

Advantageous developments are specified by the dependent claims.

The invention relates to an arrangement and a method for carrying out a self-load test having a rail vehicle that has a dual-mode drive system.

A first drive system of the rail vehicle comprises a diesel engine that is coupled to an electric generator in order to generate electrical power. The output side of the generator is connected to a DC link via a first converter, which is connected downstream of said generator, so that the power that is delivered by the generator can be transmitted as required via the first converter into the DC link.

The second drive system of the rail vehicle has an electrical line system that is connected to the DC link via a second converter, which is connected downstream of said electrical line system, so that power from the line system can be transmitted as required into the DC link.

During the self-load test of the diesel engine, the generator, the first converter, the DC link, the second converter and the line system are connected in such a way that the power delivered by the generator during the self-load test of the diesel engine passes via the first converter and via the DC link at least in part to the second converter and that the power supplied to the second converter is fed into the line system.

In one advantageous development, the DC link is connected via a third converter to a braking resistor that is arranged inside the rail vehicle.

The third converter can be actuated in such a way that, during braking, power that is no longer required is fed from the DC link to the braking resistor. The braking resistor is dimensioned in such a way that it converts the power that is fed to it into heat.

During the self-load test, the third converter can be actuated in such a way that a first portion of the power that is generated by the diesel engine and passes via the first converter into the DC link is fed from said diesel engine via the third converter to the braking resistor.

During the self-load test, the second converter can be actuated in such a way that a second portion of the power that is generated by the diesel engine and that passes via the first converter into the DC link is fed from said diesel engine via the second converter to the line system.

In one advantageous development, the line system is designed as an overhead line system or as a line system that is close to the rails.

In one advantageous development, the line system is designed as a DC-based line system or as an AC-based line system.

In one advantageous development, the AC-based line system is connected to the second converter via a transformer. The second converter is connected as an AC/DC converter in order to transmit power from the line system to the DC link. The second converter is connected as a DC/AC converter in order to transmit power from the DC link to the line system during the self-load test.

In an advantageous development, the first converter is connected as an AC/DC converter in order to transmit power from the generator to the DC link.

In an advantageous development, the third converter is connected as a DC/DC converter in order to transmit power from the DC link to the braking resistor during the self-load test or during braking.

In an advantageous development, at least one electric motor, which is coupled to a wheel of the rail vehicle as drive motor of the rail vehicle, is connected to the DC link via a further converter. Said converter is designed as a DC/AC converter and is connected in such a way that power is transmitted from the DC link to the drive motor.

The arrangement according to the invention is used to introduce the energy that is delivered by the diesel engine during the self-test into the overhead line network. It is thus no longer lost as heat but instead is available in the overhead line network for other uses. This results in a positive effect from an environmental point of view as well.

Owing to the arrangement according to the invention, the overhead line network, which is generally very receptive, is advantageously used during the self-test of the diesel engine.

Owing to the arrangement according to the invention, operators of the dual-mode rail vehicle experience lower energy costs because rail vehicles or locomotives are provided with energy meters that take energy feedback into account positively in the energy balance.

The arrangement according to the invention makes it possible for the operator to fully carry out a self-load test even in the case of an overhead line network that is not very receptive.

In summary, the diesel-electric-electric dual-mode locomotive contains in the drive system thereof a main rectifier (for example the converter WSGSW1 described below) and a separate power supply unit converter (for example the converter WSGSW2 described below), which is designed as what is known as a 4-quadrant controller.

The separate power supply unit converter takes on the feedback of the energy delivered by the diesel engine into the overhead line network via the main transformer. In this case, the main rectifier and the power supply unit converter are operated in parallel.

The vehicle control system contains software that enables the functionality of the energy feedback in the "self-load test" operating mode via the 4-quadrant controller, which then operates in inverter mode.

The braking controller is generally not activated; the installed braking resistor is generally deenergized.

If the overhead line network cannot take up all of the energy, a portion of the energy that is delivered by the diesel engine is dissipated in the installed braking resistor.

The braking controller is then actuated and the 4-quadrant controller is then operated (primarily while stationary) in a manner that limits the line current.

A portion of the energy that is delivered by the diesel engine can also be fed into the overhead line network when an external power resistor is not available to the operator.

The invention is defined by the software of the vehicle control system. This software carries out the following tasks:

The vehicle is brought into the "self-load test" operating mode; as a result, the drive inverters are purely blocked and the locomotive remains stationary.

The diesel engine power control system receives the test specification about the loading (from the on-site power requirement of the locomotive, that is to say nearly zero, up to the diesel engine nominal power).

The "energy feedback during the self-load test" operating mode is able to be preselected.

The "energy feedback during the self-load test" operating mode can be carried out at a maximum diesel engine power.

The "energy feedback during the self-load test" operating mode can be carried out with mine current limitation (for example to 80 A (@15 kV) or 50 A (@25 kV) or another value).

It is therefore also possible to convert a portion of the energy that is delivered by the diesel engine in the installed braking resistor to dissipated heat; to this end, the braking controller is actuated and operated at a braking control voltage.

BRIEF DESCRIPTION OF THE FIGURES

The invention is explained in more detail below with reference to a drawing, in which.

DETAILED DESCRIPTION OF THE INVENTION

Figure 1:
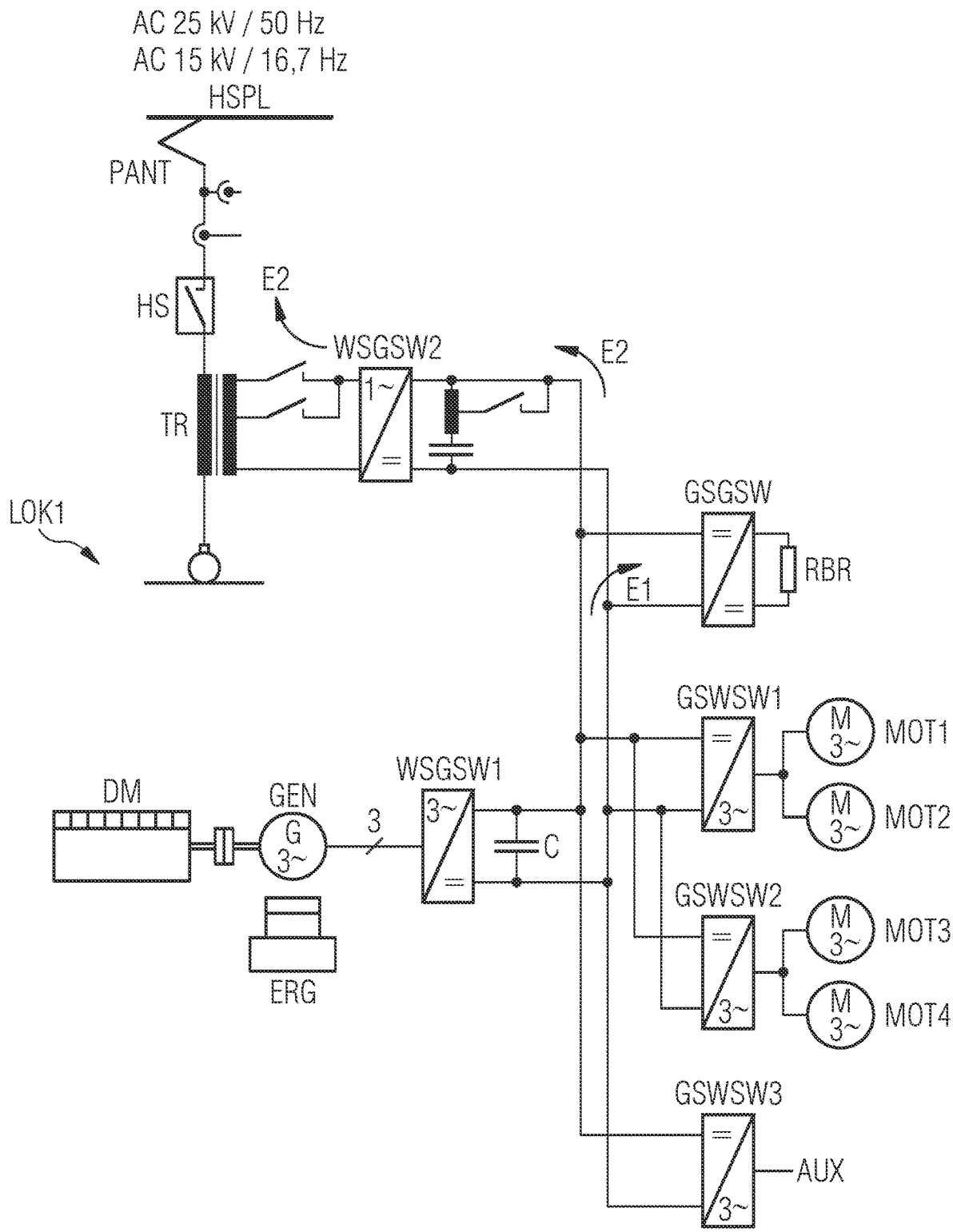
FIG. 1 shows a first configuration of the arrangement according to the invention for the self-load test in a dual-mode locomotive.

FIG. 1 shows a first configuration of the arrangement according to the invention for the self-load test in a dual-mode locomotive LOK1.

The flow of electrical power during driving operation of the dual-mode locomotive LOK1 is described below.

A first drive system is implemented by means of a diesel engine DM. The diesel engine DM is operated as an internal combustion engine and is mechanically connected to a generator GEN via a coupling. The generator GEN is mechanically driven via the diesel engine DM, wherein the generator GEN is coupled to an excitation apparatus ERG in order to form electrical power.

Electrical power that is delivered by the generator GEN passes to an AC/DC converter WSGSW1, which forms a DC voltage from the AC voltage that is supplied. In order to reduce the voltage ripple in the voltage link circuit, a capacitor C is connected in parallel or provided on the output side of the AC/DC converter WSGSW1.

The output side of the AC/DC converter WSGSW1 is connected to inputs of three parallel-connected DC/AC converters GSWSW1 to GSWSW3 such that the DC voltage that is formed by the AC/DC converter WSGSW1 is applied to all of the inputs of the three DC/AC converters GSWSW1 to GSWSW3.

What is known as a DC link is formed by the outputs of the AC/DC converter WSGSW1 and by the inputs of the DC/AC converters GSWSW1 to GSWSW3 together with the capacitor C.

The three DC/AC converter GSWSW1 to GSWSW3 form respective AC voltages from the supplied DC voltage for further use.

A first DC/AC converter GSWSW1 forms an AC voltage for a first drive motor MOT1 and for a second drive motor MOT2 for the rail vehicle or locomotive.

A second DC/AC converter GSWSW2 forms an AC voltage for a third drive motor MOT3 and for a fourth drive motor MOT4 of the rail vehicle or locomotive.

A third DC/AC converter GSWSW3 forms an AC voltage for the auxiliary drives (for example compressors, ventilation, etc.) or for further uses, denotes as AUX, in the rail vehicle or locomotive.

The output side of the AC/DC converter WSGSW1 is also connected to inputs of a DC/DC converter GSGSW, which is also connected in parallel with the three DC/AC converters GSWSW1 to GSWSW3.

The DC voltage that is formed by the AC/DC converter WSGSW1 is thus applied to the inputs of the DC/DC converter GSGSW.

The inputs of the DC/DC converter GSGSW are also part of the DC link.

A braking resistor RBR is connected to the output side of the DC/DC converter GSGSW.

When the drive motors MOT1 to MOT4 are braked, power or energy that is not required is fed from the DC link via the DC/DC converter GSGSW to the braking resistor RBR, which converts said power or energy into heat.

As an alternative to the drive train via the diesel engine DM, a further drive train is provided, which is based on electrical operation using a current collector or pantograph PANT.

The current collector PANT draws electrical power or energy from an overhead line or high-voltage line HSPL and feeds same to a transformer TR via a main switch HS.

The transformer TR forms from an AC input voltage fed thereto a predetermined AC output voltage, which passes to inputs of a further AC/DC converter WSGSW2.

The AC/DC converter WSGSW2 forms from the AC voltage fed thereto a DC voltage for the DC link.

This DC voltage passes to the inputs of the three DC/AC converters GSWSW1 to GSWSW3 and to the inputs of the DC/DC converter GSGSW and from there, as described above, to the respective further use.

The flow of electrical power during the self-test of the diesel engine DM of the dual-mode locomotive LOK1 is described below.

The electrical power that is formed during the self-test of the diesel engine DM passes to the DC link, as described above.

No power is required by the motors MOT1 to MOT4 during the self-test, with the result that the power is divided as described below.

A first portion E1 of the power passes via the DC/DC converter GSGSW to the braking resistor RBR, which is arranged in the rail vehicle or in the locomotive. The braking resistor RBR converts the partial electrical powers E1 fed thereto into heat.

A second portion E2 of the power passes from the DC link via a series circuit, which comprises the converter WSGSW2, the transformer TR, the main switch HS and the pantograph PANT, to the high-voltage line HSPL.

Owing to the division of the power, it is advantageously possible to omit a load resistor outside of the rail vehicle.

Figure 2:
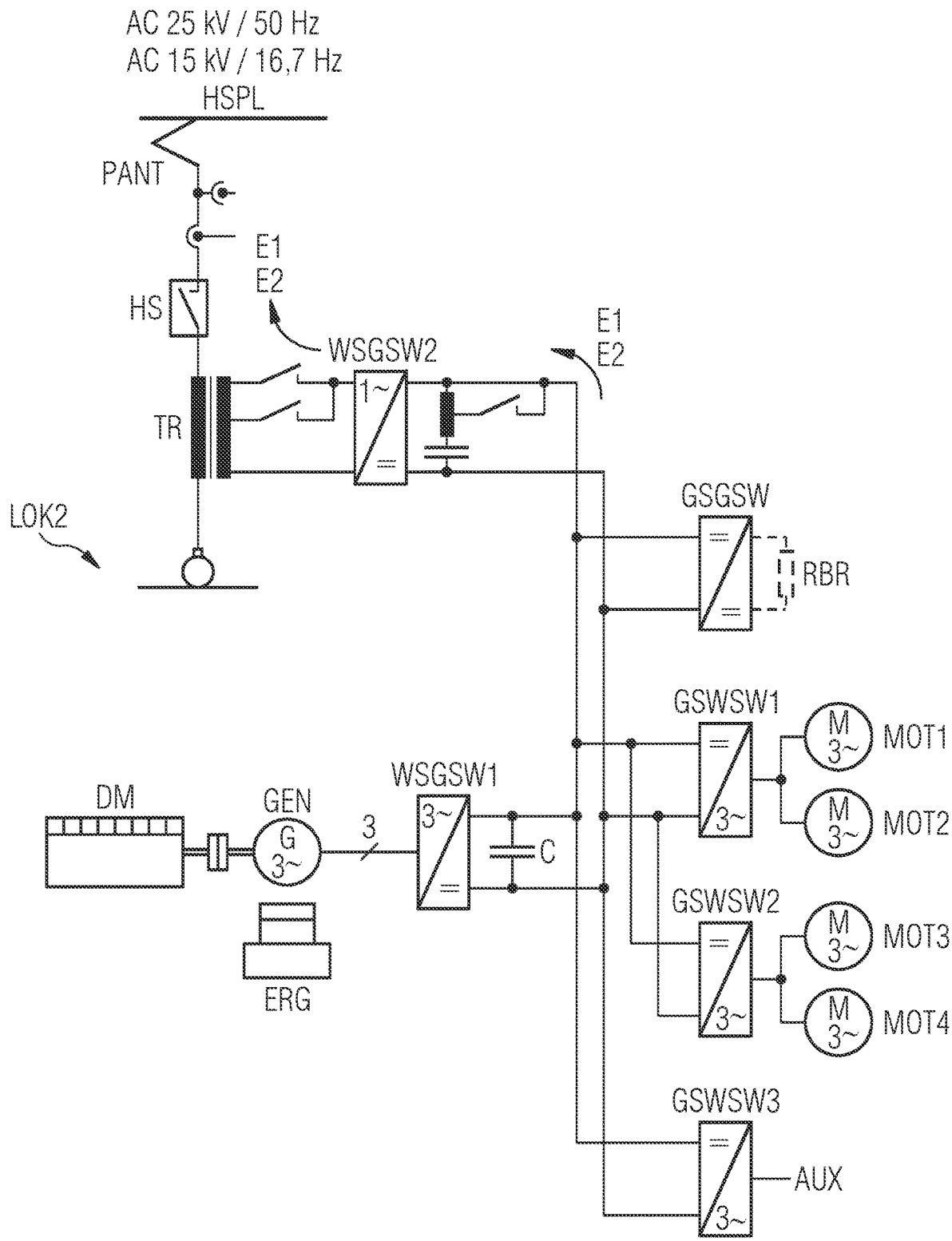
FIG. 2 shows a second configuration of the arrangement according to the invention for the self-load test in a dual-mode locomotive.
Figure 3:
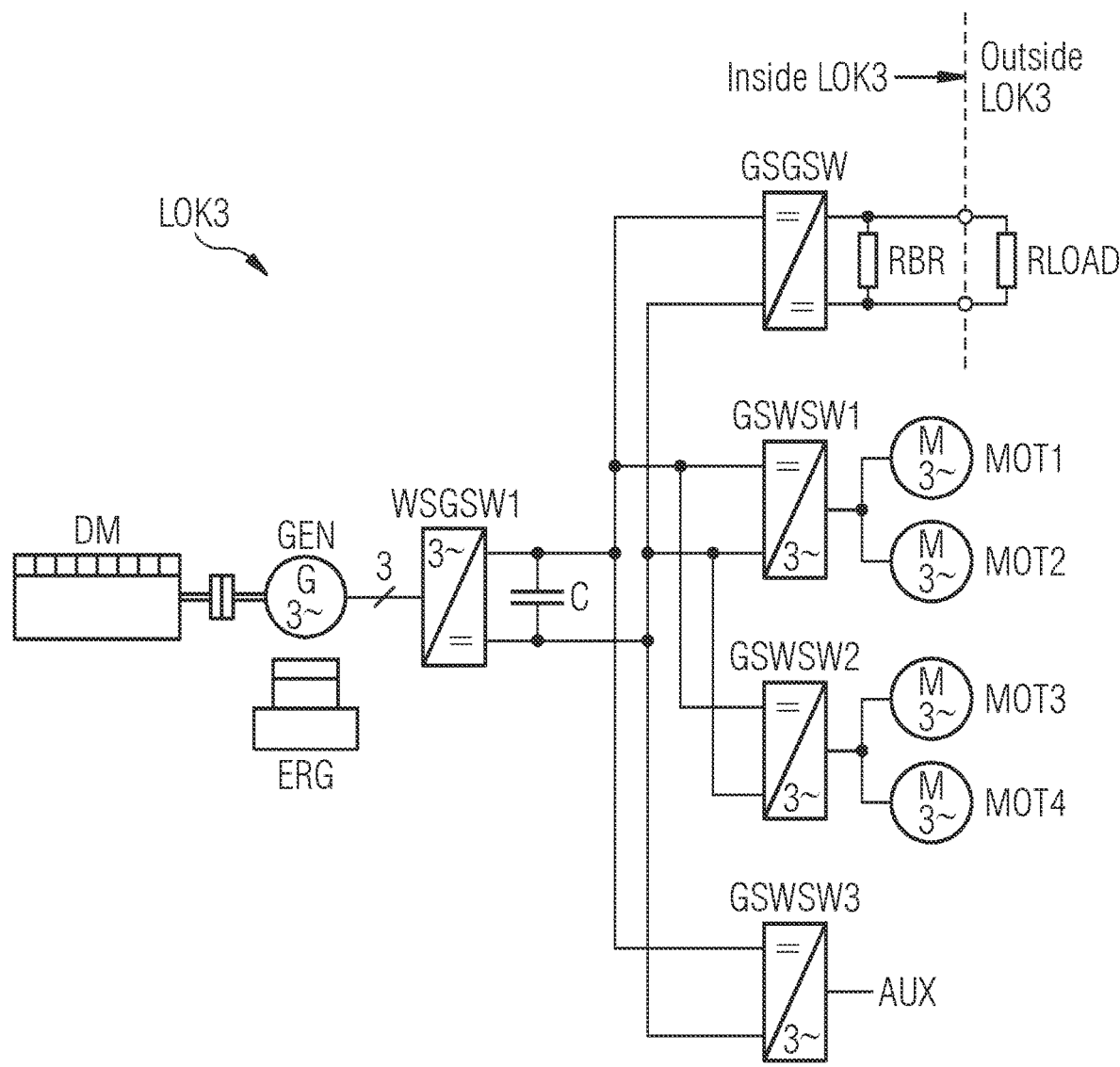
FIG. 3 shows the self-load test described in the introduction including associated components in a diesel-electric locomotive.
Figure 4:
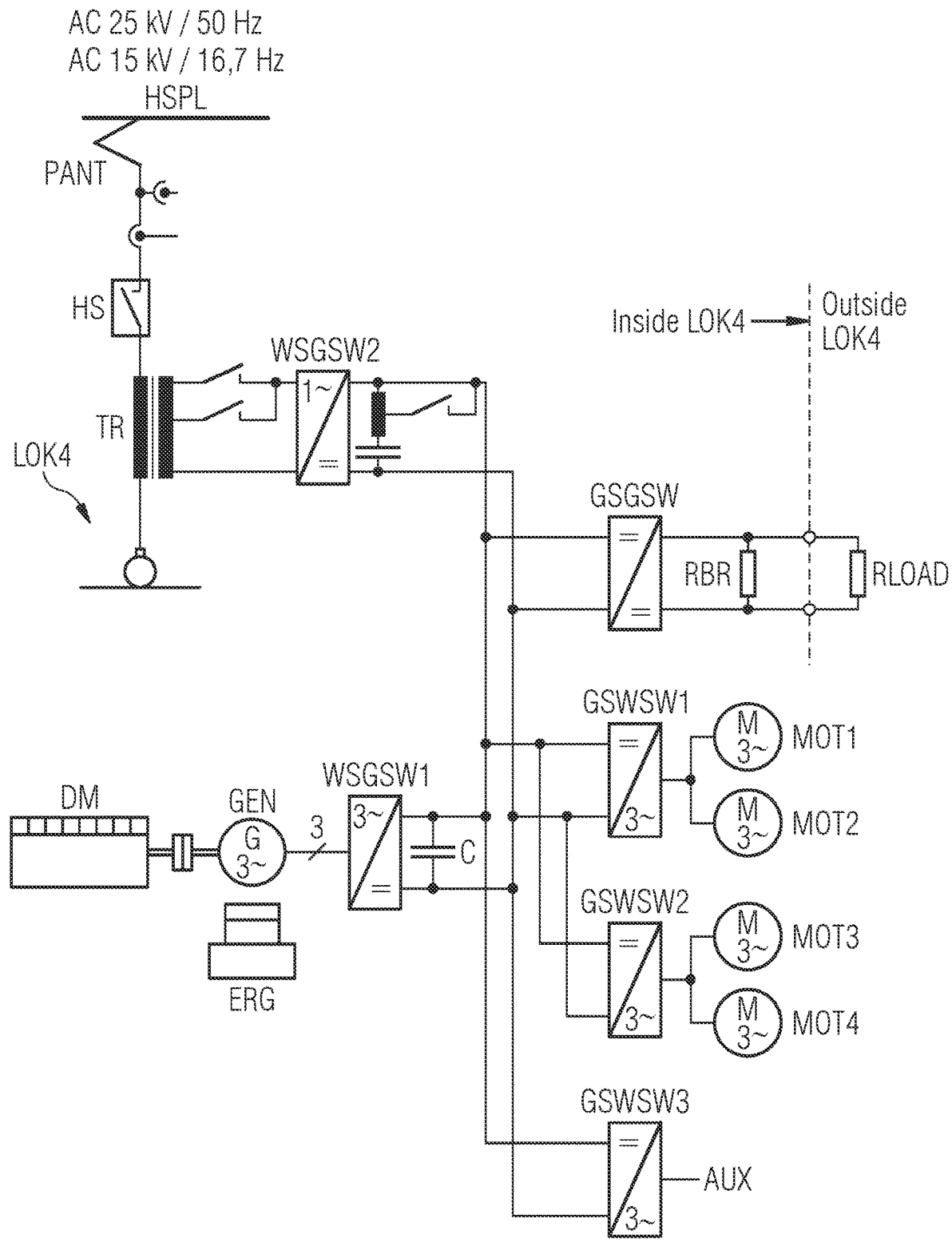
FIG. 4 shows the self-load test described in the introduction including associated components in a dual-mode locomotive.

FIG. 2 shows a second configuration of the arrangement according to the invention for the self-load test in a dual-mode locomotive LOK2.

The statements made above apply to the same reference signs in relation to FIG. 2.

In a deviation from FIG. 1, in this configuration, it is not just a proportion of the power that is fed via the series circuit to the high-voltage line HSPL during the self-load test but all of the power, that is to say E1 and E2.

It is advantageously possible here to fully omit the involvement of the braking resistor RBR. The braking resistor RBR is therefore deenergized.

The invention claimed is:

1. An arrangement for carrying out a self-load test, comprising:
    a rail vehicle having a dual-mode drive system with a first drive system and a second drive system;
    said first drive system of the rail vehicle having a diesel engine coupled to an electric generator for generating electrical power;
    said generator having an output side connected to a DC link via a first converter, connected downstream of said generator, for selectively transmitting the electrical power generated by the generator via said first converter into the DC link;
    said first converter being an AC/DC converter configured to transmit power from said generator to the DC link;
    said second drive system of the rail vehicle having an electrical line system connected to the DC link via a second converter, connected downstream of the electrical line system, for selectively transmitting power from the electrical line system into the DC link;
    a third converter connecting said DC link to a braking resistor inside the rail vehicle, said third converter being configured, during braking, to feed power that is no longer required from the DC link to the braking resistor, and said braking resistor being dimensioned to convert the power into heat;
    wherein, during a self-load test of the diesel engine, in which a load is applied to the diesel engine at a maximum corresponding to a nominal load of the diesel engine:
        the third converter is selectively actuated to feed a first portion of the power generated by the diesel engine and passing via the first converter into the DC link via the third converter to the braking resistor;
        the second converter is selectively actuated to feed a second portion of the power generated by the diesel engine and passing via the first converter into the DC link via the second converter to the line system; and
    said third converter being a DC/DC converter configured to transmit power from the DC link to said braking resistor during the self-load test.

2. The arrangement according to claim 1, wherein the line system is an overhead line system or a line system in a vicinity of the rails.

3. The arrangement according to claim 1, which comprises:
    at least one electric motor coupled to a wheel of the rail vehicle and forming a drive motor of the rail vehicle, and a further converter connecting said at least one electric motor to the DC link; and
    said further converter being a DC/AC converter connected to transmit power from the DC link to said drive motor.

4. The arrangement according to claim 1, wherein the line system is a DC-based line system or an AC-based line system.

5. The arrangement according to claim 4, wherein:
    said AC-based line system is connected to said second converter via a transformer;
    said second converter is connected as an AC/DC converter in order to transmit power from the line system to the DC link; and
    said second converter is connected as a DC/AC converter in order to transmit power from the DC link to the line system during the self-load test.

6. A method of carrying out a self-load test in a rail vehicle that has a dual-mode drive system,
    wherein, in a first drive system of the rail vehicle, a diesel engine drives an electric generator through coupling in order to generate electrical power;
    wherein the electrical power delivered by the generator passes as required via a first converter to a DC link;
    wherein a second drive system of the rail vehicle draws power from an electrical line system as required and passes the power to the DC link via a second converter;
    the method which comprises:
    during a self-load test of the diesel engine for suitability testing, applying a load to the diesel engine which, at a maximum, corresponds to a nominal load of the diesel engine;
    providing a third converter with an input side connected to the DC link and an output side connected to a braking resistor inside the rail vehicle, and controlling the third converter during braking to feed power that is no longer required from the DC link to the braking resistor, and converting the power received by the braking resistor into heat;
    during the self-load test, controlling the third converter to conduct a first portion of the power that is generated by the diesel engine and that passes via the first converter to the DC link to the braking resistor;
    during the self-load test, controlling the second converter to conduct a second portion of the power that is generated by the diesel engine and that passes via the first converter into the DC link to the line system;
    operating the first converter as an AC/DC converter in order to transmit power from the generator to the DC link; and
    using the third converter as a DC/DC converter in order to transmit power from the DC link to the braking resistor during the self-load test.

7. The method according to claim 6, which comprises:
    using at least one electric motor as a drive motor of the rail vehicle, with the motor being coupled to a wheel of the rail vehicle;
    connecting the electric motor to the DC link via a further converter; and
    operating the further converter as a DC/AC converter in order to transmit power from the DC link to the drive motor.

8. The method according to claim 6, wherein:
    the line system is an overhead line system or a line system that is close to the rails; and/or
    the line system is a DC-based line system or an AC-based line system.

9. The method according to claim 8, which comprises:
    connecting the AC-based line system to the second converter via a transformer;
    using the second converter as an AC/DC converter in order to transmit power from the line system to the DC link; and
    using the second converter as a DC/AC converter in order to transmit power from the DC link to the line system during the self-load test.

* * * * *